(12) United States Patent
Keller et al.

(10) Patent No.: US 8,122,371 B1
(45) Date of Patent: Feb. 21, 2012

(54) CRITERIA-BASED STRUCTURED RATINGS

(75) Inventors: Thomas L. Keller, Renton, WA (US); James G. Robinson, Olympia, WA (US); Scott Allen Mongrain, Seattle, WA (US); Oystein Hernes, Everson, WA (US)

(73) Assignee: Amazon Technologies, Inc., Reno, NV (US)

( * ) Notice: Subject to any disclaimer, the term of this patent is extended or adjusted under 35 U.S.C. 154(b) by 1057 days.

(21) Appl. No.: 11/963,309

(22) Filed: Dec. 21, 2007

(51) Int. Cl.
*G06F 3/048* (2006.01)

(52) U.S. Cl. .................... 715/780; 715/764; 715/781

(58) Field of Classification Search .................. 715/780, 715/781, 764, 801
See application file for complete search history.

(56) References Cited

U.S. PATENT DOCUMENTS

| | | | |
|---|---|---|---|
| 7,031,952 B1 | 4/2006 | Heumann et al. | |
| 7,210,102 B1 | 4/2007 | Gordon et al. | |
| 7,814,029 B1 * | 10/2010 | Siegel | 705/347 |
| 2006/0111959 A1 * | 5/2006 | Tarr et al. | 705/10 |
| 2006/0212435 A1 | 9/2006 | Williams et al. | |
| 2006/0236241 A1 * | 10/2006 | Harada et al. | 715/700 |
| 2007/0106794 A1 | 5/2007 | Manber et al. | |
| 2008/0147483 A1 * | 6/2008 | Ji | 705/10 |

* cited by examiner

*Primary Examiner* — Tuyetlien Tran
*Assistant Examiner* — Truc Chuong
(74) *Attorney, Agent, or Firm* — Kilpatrick Townsend & Stockton LLP

(57) ABSTRACT

Criterion-based feedback allows users to provide useful information in a quick and easy to understand fashion. When information for an item is relayed to a user, the user is provided with the ability to provide feedback for any criteria relating to the item. In some embodiments, this feedback takes the form of a submission of a response to a question or statement pertaining to a criterion for the item. The user is able to create new responses if the existing responses do not adequately convey the feedback that the users wishes to submit. Further, a user can also submit entirely new questions and/or statements, along with corresponding new responses, that correspond to a criterion relating to the item. Such an approach provides flexibility for users to quickly and easily provide feedback on specific criteria that might be useful for other users viewing information for that item.

25 Claims, 11 Drawing Sheets

- Prior Art -

CRITERIA-BASED STRUCTURED RATINGS

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

The present disclosure relates generally to providing information relating to items in a network environment, and in particular to providing users with the ability to submit feedback on any appropriate criterion related to an item.

As an ever increasing amount of information about a wide variety items become available electronically, such as from a retailer or provider over the Internet, it becomes increasingly difficult to compare and research the various items. For example, a user or customer looking to purchase a suitable toy for a toddler and that might be appropriate. Oftentimes, a site will have one or more pictures of a toy, as well as specifications and details provided by the manufacturer or retailer of the toy. Such information is typically very objective, including information such as the dimensions and weight of the toy, but does not really give the customer a good feel for whether the toy is appropriate for a toddler, as well as whether the toy is durable or educational, for example.

In order to obtain more information about the toy, the user might use a search engine to attempt to locate reviews or other information about the toy(s) on other sites. This is a time-consuming process for the customer, and is undesirable to the retailer selling the toy because the customer is leaving the retailer site in order to obtain additional information, and might end up purchasing the toy elsewhere as a result. Further, there are thousands upon thousands of toys available, and often there is not a lot of information available for any given toy.

Various retailer sites have attempted to solve such problems by providing various forms of feedback and opinion-related options to its users. In some cases, a retailer might hire reviewers to provide reviews for certain items. This approach is costly to the retailer, and only provides a limited amount of additional information as it is limited to one person's perspective on each selected item. Many sites alternatively (or in addition) allow users to submit reviews for various items. These user reviews can provide a wealth of information, but the reviews can be unwieldy to parse through and it can be tough for a user to get a quick and useful overview of items based on the volume of information that may be available for a given category of items. Further, it takes a substantial amount of time and effort for a user to submit a review, such that users might be unwilling to submit a review for an item unless the users are extremely unhappy with the item, for example.

Some sites have attempted to make it easier for users to submit feedback for an item, and thus get a better overview of user opinions of the item, by allowing users to rate an item on a numerical scale or a star rating system, for example. Such information is only somewhat useful, however, because the rating system does not provide any context for the rating. For example, it is impossible to know whether a toy receives a rating of 5 on a 10 scale because it is not durable, because it does not work as expected, because it is not fun, or any other such reason. Further, some sites use the rating system only to suggest items to a user, and do not factor these ratings into an overall rating for the item, instead basing the overall rating only on aggregating ratings provided with the full reviews.

The limited amount of feedback information available can be particularly problematic for certain items, such as laptop computers. A user might want to find out any of a wide variety of important information for a laptop such as whether the laptop is durable, whether it is good for gaming, how the battery life compares to other laptops, if there are an unusually high number of crashes or error messages, or other such information that typically would not be found in the objective item information and might, at best, be buried in one of a number of long user reviews.

Some Web sites have added limited context with the numerical-style rating system in order to attempt to provide more useful feedback. For example, a site might ask users to rate how educational a toy is on a scale of 1 to 5. Such an approach requires the site to generate and maintain questions and answers for each item, as well as to attempt to determine which questions and answers would be useful. Such an approach also typically results in a limited number of questions, as the site does not want the overhead of creating a volume of questions for an item. Further, such an approach only gives objective numerical-type ratings, and does not provide any substantive context for the ratings.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure may overcome one or more the aforementioned and other deficiencies experienced in conventional approaches to soliciting, obtaining, processing, managing, displaying, and otherwise handling feedback and related information for items in an electronic and/or networked environment. As used herein, the term "item" can refer to anything that can be ordered, purchased, rented, used, or otherwise consumed and/or accessed via a network request or electronic submission, such as a product, service, or system. A request can include any appropriate request sent over an appropriate system or network, such as a request submitted to a Web page over the Internet or a message sent via a messaging system to a content provider, for example.

Figure 1:
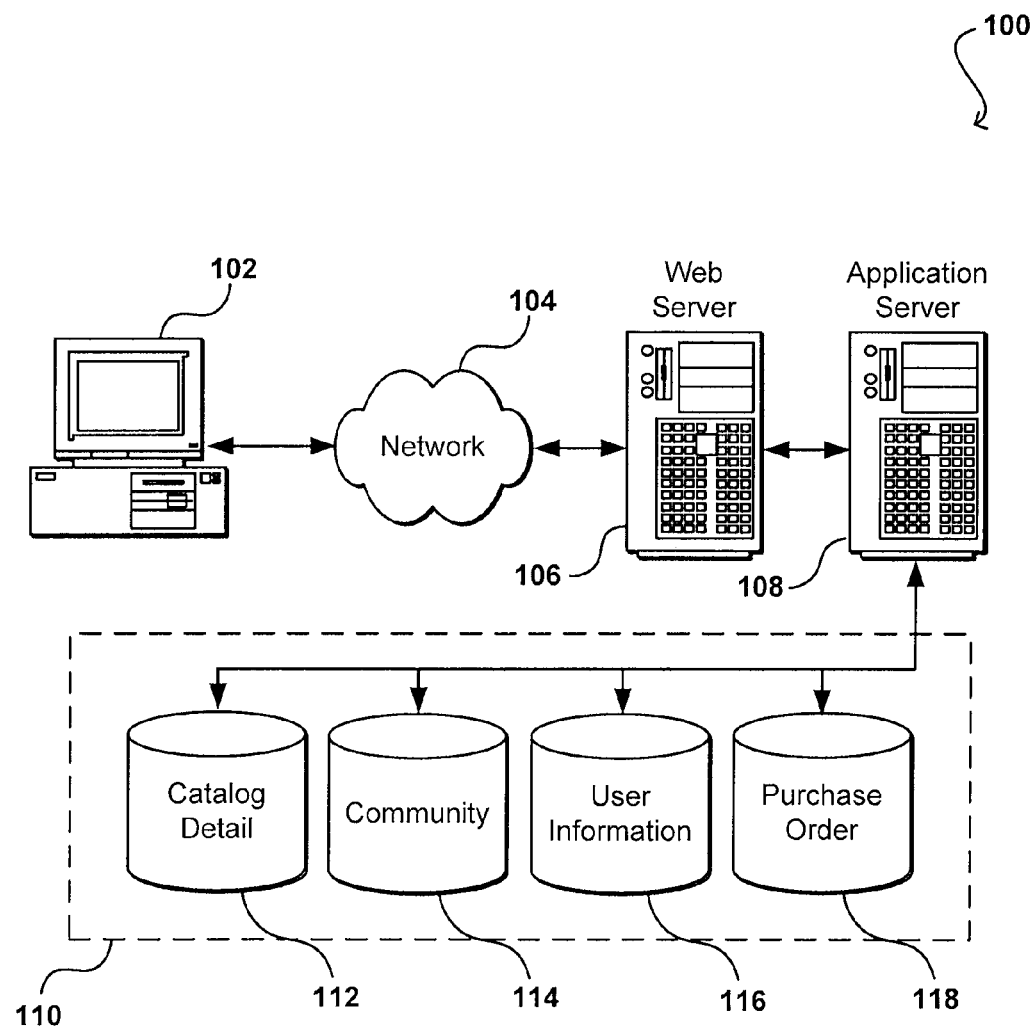
FIG. 1 illustrates a system configuration that can be used in accordance with one embodiment.

FIG. 1 illustrates an example of a environment 100 for implementing aspects in accordance with various embodiments. As will be appreciated, different environments may be used, as appropriate, to implement various embodiments. The environment 100 shown includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The environment in one embodiment is a distributed computing environment utilizing several computer systems and components that are interconnected via communication links, using one or more computer networks or direct connections. However, it will be appreciated by those of ordinary skill in the art such a the system could operate equally well in a system having fewer or a greater number of components than are illustrated in FIG. 1. Thus, the depiction of the system 100 in FIG. 1 should be taken as being illustrative in nature, and not limiting to the scope of the disclosure.

The illustrative environment further includes at least one application server 108 and a data store 110. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of html for at least one Web page using hypertext transfer protocols. The handling of all requests and responses, as well as the delivery of content between the client device 102 and the application server 108, can be handled by the Web server.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The data store 110 can include several separate data tables, databases, or other data storage mechanisms and media for storing data relating to a particular aspect. For example, the data store illustrated includes mechanisms for storing catalog detail data 112, community data 114, user information 116, and purchase order data 118. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Figure 2:
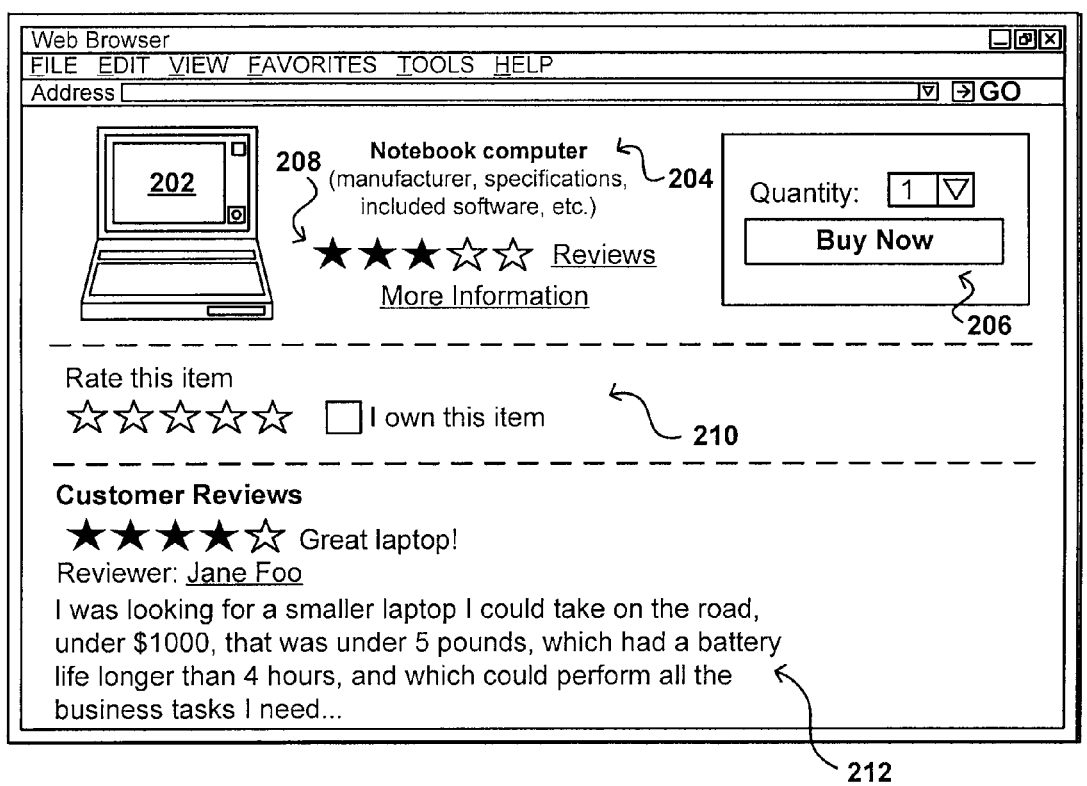
FIG. 2 illustrates an example of a user interface of the prior art.

For example, FIG. 2 illustrates a graphical user interface window 200 for a browser application on a client device, here displaying a Web page in which a user is able to view information relating to an item of interest, in this case a particular laptop. In this example, the item is being viewed in a page provided by an electronic retailer, wholesaler, or other such provider, where is displayed an image 202 of that type of laptop, item information 204 about that type of laptop, and a user-selectable purchase element 206 allowing the user to purchase the laptop (or at least place the laptop into a virtual shopping cart or shopping bag as known in the art for subsequent purchase). Mechanisms for searching and displaying inventory, managing item information, running an electronic store or outlet, providing for user purchasing, and other related functionality are well known in the art and will not be discussed herein in detail.

Also shown in the illustrative user interface of FIG. 2 is an assortment of feedback elements representative of feedback mechanisms of the prior art. For example, the page includes a rating indicator element 208 that gives a numerical-style indication of the quality or overall worth of the item. In this case the element 208 shows that the laptop displayed has an overall current rating of 3 out of 5 possible stars. The rating can be determined in any of a number of possible ways. For example, an employee of the site can provide the rating value or another professional reviewer can provide the value. In another example, users (e.g., certain users or all users) are each able to submit their rating value, with the rating values for any given item then being aggregated or averaged to determine a current rating, which can change over time as the number of rating values that is received increases. The ratings that are aggregated can vary by type of rating, as will be described in more detail below, as in some cases all user ratings might be aggregated, while in other cases only those users submitting full reviews can have their ratings aggregated for an item.

A user-selectable rating element 210 simply allows a user to click on the number of stars that the user wishes to give to the item. In some cases, this rating is included in determining the overall rating for the item, while in other cases the rating is a private rating that is used only for that user, for purposes such as to suggest related or other items to the user. For example, if a user rates a first music artist consistently high and a second music artist consistently low, these ratings can be used to suggest other music from the first artist, music by artists similar to the first artist, or music purchased or rated highly by users also purchasing or highly rating the first artist, while avoiding suggesting music by the second artist and artists similar thereto. The user also be displayed an element allowing the user to indicate that the user already owns the item, in order to not be suggested that particular item.

Also displayed is a full review 212 from another user. The review can provide any information the submitting user wishes to provide, in paragraph form, and can include an overall rating provided by that user. There also can be a link or other user-selectable element that allows the user to view other reviews for the item and/or to submit a new full review for the item.

As discussed above, such feedback mechanisms are inherently limited, as the numerical style rating does not provide any context or reason for the rating. On the other hand, the full review can provide as much context as a user wishes to submit (typically up to a limit on the number of characters), but since this can be a time-consuming process it may discourage many users from submitting a review. Furthermore such full reviews can be difficult for later users who are researching purchasing decisions to sort through, particularly when comparing a number of different items.

Systems and methods in accordance with various embodiments address these and other deficiencies and aspects by, among other techniques, providing users with the abilities to view, search, submit, and/or otherwise utilize various types of criteria-based structured ratings and feedback mechanisms for items presented in an electronic environment, such as is described above with respect to FIG. 1. Users can have the ability to select any criterion about an item and submit a question, statement, response, or other feedback about that criterion. Examples of such criteria include, for example, the educational value, durability, and fun of a toy; the service and coverage for a wireless device; and food quality, ambiance, and perceived value for a restaurant. A user also can respond to any of a number of existing questions and statements for an item, in order to provide more useful feedback in a way that is quick and easy for the user.

Figure 3:
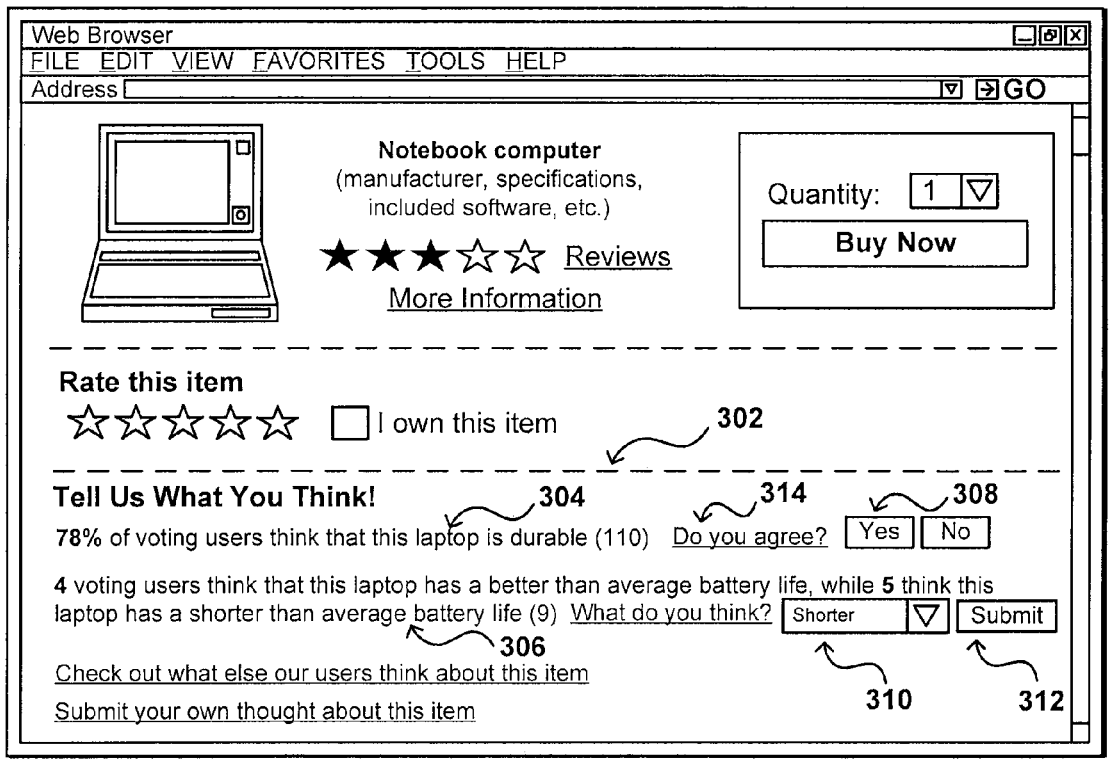
FIG. 3 illustrates an example of a graphical user interface showing structured ratings for an item in accordance with one embodiment.

FIG. 3 illustrates an example user interface 300 in a browser window showing feedback elements in accordance with one embodiment. As with existing interfaces, information such as an image, title or name information, and data or other information about the item is displayed, along with options to purchase the item, write a full review, or provide a general rating for the item. Illustrated in this example, however, is a feedback portion 302 including previously submitted response values for a selected number of criteria-based structured ratings for the item. In this portion is displayed a first existing statement 304 relating to a criterion of the item, in this example the criterion being a durability of the laptop. As displayed, this statement indicates that 78% of the voting users have indicated that they believe the laptop is durable. Also shown with the statement is an indication that 110 users have voted, giving the user an idea of the reliability of the rating. A second existing statement 306 relates to another criterion, in this case a battery life of the laptop. This statement indicates that 4 voting users think that the laptop has a better than average battery life, while 5 think the laptop has a shorter than average battery life. In the first statement, where the answer was a binary-type "yes" or "no" answer, a decision might be made to only show the majority answer (here that most voting users think the laptop is durable), as only showing one answer saves real estate on the page and avoids presenting duplicative information that can readily be determined by the user. As the second sentence can have more than two responses, as will be discussed below, the user interface might instead show all possible responses, responses which at least one user has selected, or the most popular responses. Also, the first statement shown uses percentages while the second statement uses actual numbers. It should be understood that any of a number of methods could be used to indicate the relative responses of the voting users for that criterion, such as pie charts, histograms, numbers, text, images, or other indicators known in the art for indicating vote distribution. In one embodiment, numbers of voting users are displayed up until a minimum number of users have voted, such as at least ten users, after which percentages relative to the total number of voting users for that criterion are displayed. Displaying the number of voters in the case of a percentage or histogram, for example, helps users to determine how much to rely upon the rating, as if only 10 users voted then one really high or really low rating can skew the impression, while if 1000 users have voted then the user can get a better overall impression of the worth of the criterion values.

Along with being able to view the existing questions, statements, and responses for various criteria, a user also is presented with the ability to submit feedback for any of these criteria. For example, in the case of a binary question or statement such as the first statement, the user can be presented with a set of user-selectable elements 308 (such as selectable buttons, checkboxes, icons, etc.). In this case the user can simply click on a "yes" or "no" element, and the user feedback will be submitted for the user and the feedback rating will be automatically aggregated and updated in the displayed first statement 304. The user feedback can be stored in an appropriate location, such as the "community" data store in FIG. 1. The interface (or a portion thereof) can be refreshed in order to show the updated rating.

In the case of the second statement 306, which can have multiple answers, the user can have a user-selectable option 310 presented, such as a dropdown menu or rollover box, that allows the user to immediately select one of the existing responses. Upon selecting a response, the feedback can be automatically submitted and recorded, or the user can be required to select a submit option 312, or similar mechanism, which allows the user to review and/or change the feedback before submission. In some embodiments, a user will be able to change a previously-submitted rating by voting again, but in other embodiments the user will not be able to re-vote or change the feedback after a vote has been submitted for a criterion.

In some embodiments, or in cases where a user does not have JavaScript or a similar language or capability enabled, automatic voting elements such as elements 308 and 310 might not be included, displayed, or enabled, and a user might have to select a user-selectable element such as hyperlink 314, which will open a new page, window, panel, popup, or other such area in which the user is able to submit feedback.

Figure 4:
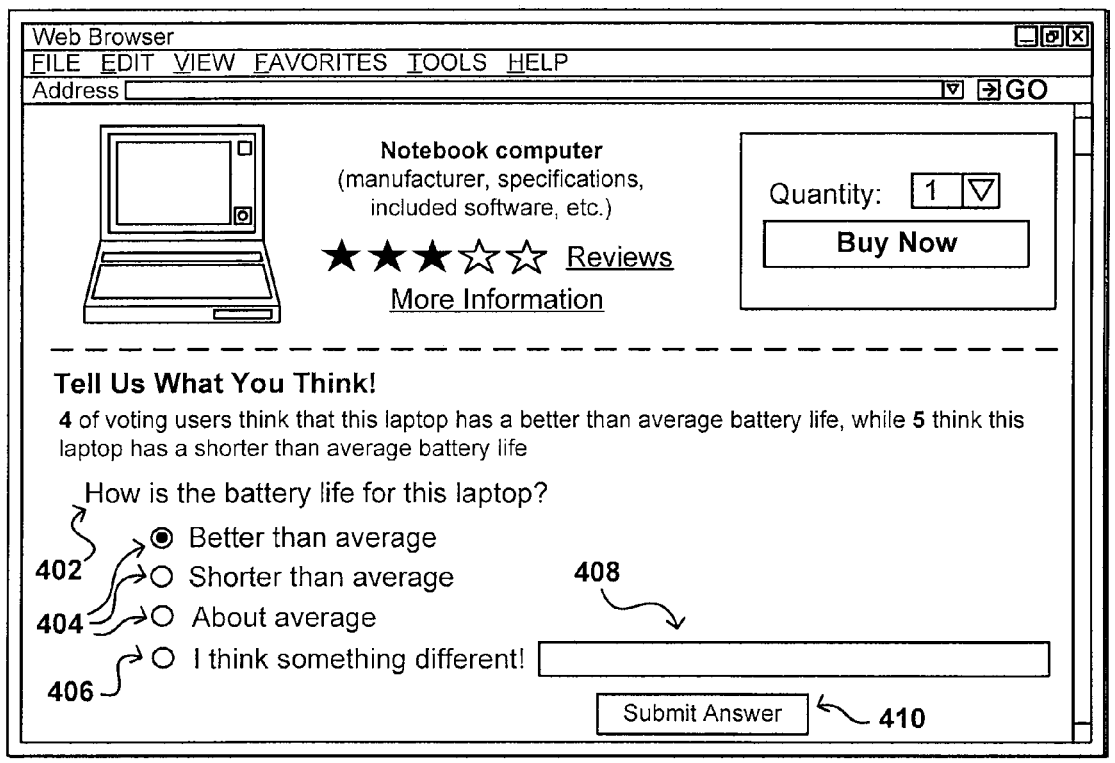
FIG. 4 illustrates an example of a user interface showing possible responses in accordance with one embodiment.

FIG. 4 illustrates an example of one such new user interface display 400 that can be generated when the user selects a link or similar element to submit feedback for an existing criteria, although as described other embodiments might use pop-ups, new windows, frames, panels, or other mechanisms to display such information. In this example, information about the item is still displayed to provide context to the user. The user interface also includes the existing statement for the criterion including existing feedback results. In one embodiment, a question 402 is displayed to the user for the particular criterion for which the user wishes to submit feedback. Although the relevant criterion and responses were displayed previously in the form of a statement, a question can be associated with the statement which more clearly directs the user how to submit an appropriate response. For example, in response to the question "how long is the battery life for this laptop," the user is able to select one of the existing responses 404, or an answer to the question 402, such as by selecting a radio button for the answer and hitting a submit button 410 (or by using any similar voting mechanism as discussed or suggested elsewhere herein).

If, however, the user wishes to submit feedback that is not adequately represented by one of the existing responses 404, the user is able to select an option, such as any appropriate user-selectable add feedback element, to submit a new response 406. In one example, a user can be presented with a text box, text field, or other text entry element 408, which allows the user to type, paste, select, or otherwise indicate a response that the user would like to submit. In this example the user selects a radio button corresponding to a new response, enters text in the text field 408, and selects the submit button 410. In other examples the options can be presented using any appropriate selectable elements, such as links, selectable icons, drop-down menus, etc. Depending on the type of selectable element, the user might also have to select an element to submit, accept, or otherwise process the response. In order for the response to be useful, it should relate to the specific criterion. For example, in this example the criterion is "battery life," so the response should relate directly to that criterion. In some cases, a user may be prompted with options that are determined to be applicable based on, for example, responses for similar items with the same criterion. Such default responses can be displayed to the user in the appropriate field 408, such as the text box, drop-down menu, or similar element discussed earlier.

Figure 5:
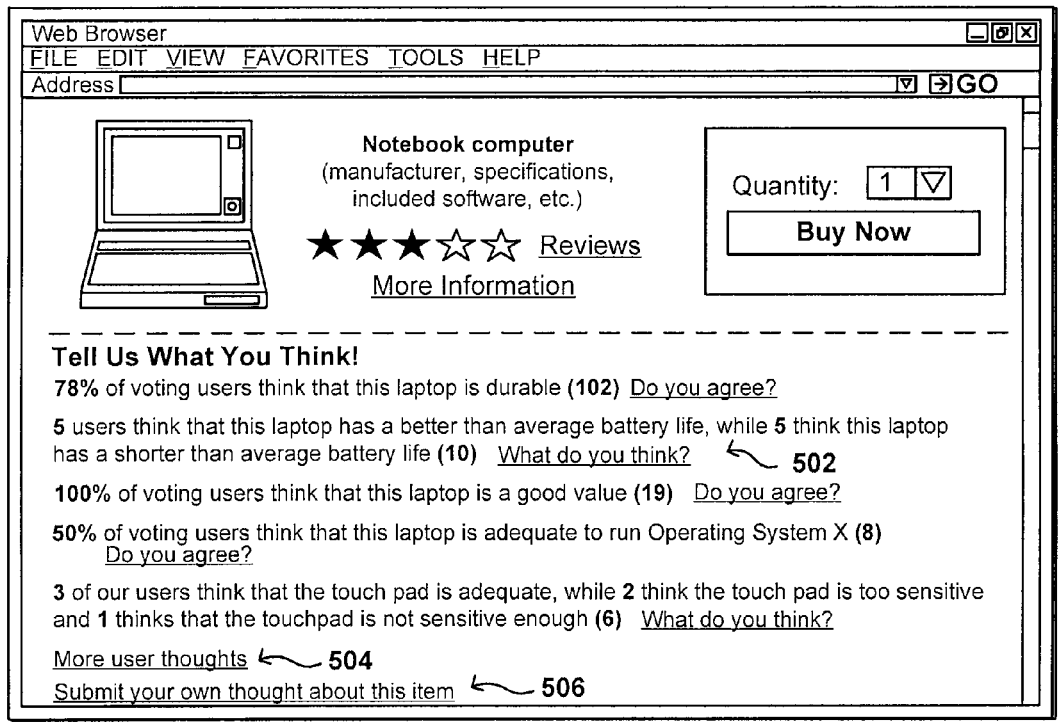
FIG. 5 illustrates an example of a user interface showing added structured ratings for an item in accordance with one embodiment.

After the user submits the feedback, the user can be directed back to the display of the item information 500 as illustrated in FIG. 5. As can be seen, the statement displayed 502 for that criterion has been updated to reflect the newly-submitted feedback from the user. A number of criterion-based statements can be displayed as discussed earlier, and these statements are continually sorted in one embodiment (such as upon each request for a page containing that information) to display the statement with the most responses at the top, with each subsequent displayed statement having fewer responses. For example, in the example the top statement indicates 102 responses, while the bottom displayed statement indicates 6 responses. The sort can also be done in a number of other ways, such as by weighting certain criteria, weighting votes of certain users, or any other appropriate way of utilizing a weighted sort known or used in the art. In some instances, an owner of the site might select certain criterion to appear on the page in a certain order, while some will give the rating of experienced or "super" users more weight than novice users, or will give more weight to users who have indicated that they actually own or have purchased the item.

While a selected number of statements might be displayed in order to conserve real estate and resources, the user interface 500 can also include a link 504 or other selectable element allowing the user to view any additional statements and responses for this item, which can in various embodiments involve displaying a new page, a pop-up window, a new window, a new panel, or any other appropriate mechanism to display the additional information. On such a page, the user can view all responses to all statements and questions submitted for criterion relating to the item. As is common in the art, if there are many such statements then the statements can be displayed in groups or a specified number at a time, can allow a user to search for a statement by keyword or criteria, or can provide any other functionality known or used for searching or accessing a list of results. For each statement displayed, regardless of the display mechanism, the user can have the ability to submit feedback for that criterion.

Similarly, a question or statement might have several responses, and an application might be configured to only show the two or three most popular responses on a main page, for example, while a link or other selectable element can allow a user to view all available responses. As will be discussed later herein, responses from an expert user or other such users might be given more weight, such that a response from a user might be shown on the primary page even if that response has not necessarily received enough votes to otherwise qualify.

It should be noted that in at least some embodiments a user must at least be logged in to the system (or otherwise identified or authenticated to the system) in order to submit feedback for an item. Requiring a user to first be authenticated and/or authorized provides some control over persons wishing to skew the results for an item, such as to make one item appear better than another or submit fake or fraudulent feedback. In some embodiments, a user must have made at least one purchase through the system in order to obtain the privileges to submit feedback. In some embodiments, a user can have an associated "reputation" as known in the art, which allows other users to tag, flag, or otherwise submit feedback for the user when the user does something inappropriate, for example. In such cases, a user might also have to have a minimum reputation level before being able to leave feedback. In some cases, a user with less than a minimum reputation level might have to have any new submissions reviewed before those submissions are posted to the Web site. Further, a user might have voting privileges taken away in response to certain actions, such as submitting inappropriate content or threatening another user. There are a number of security, authentication, identification, rights management, and other such approaches that could be used as would be apparent to one of ordinary skill in the art in light of the teachings and discussion contained herein.

While the above examples describe how a user might submit feedback for a given criterion when a statement or question is presented, FIG. 5 shows a user-selectable element 506 that allows a user to submit a new question and/or statement for a new or different criterion for that item. Since there can be a number of items involved in creating a new question and/or statement and a set of new responses, this typically will involve a new area such as a pop-up window, a new page, a new window, or another such mechanism that allows a user to fully input such information.

Figure 6:
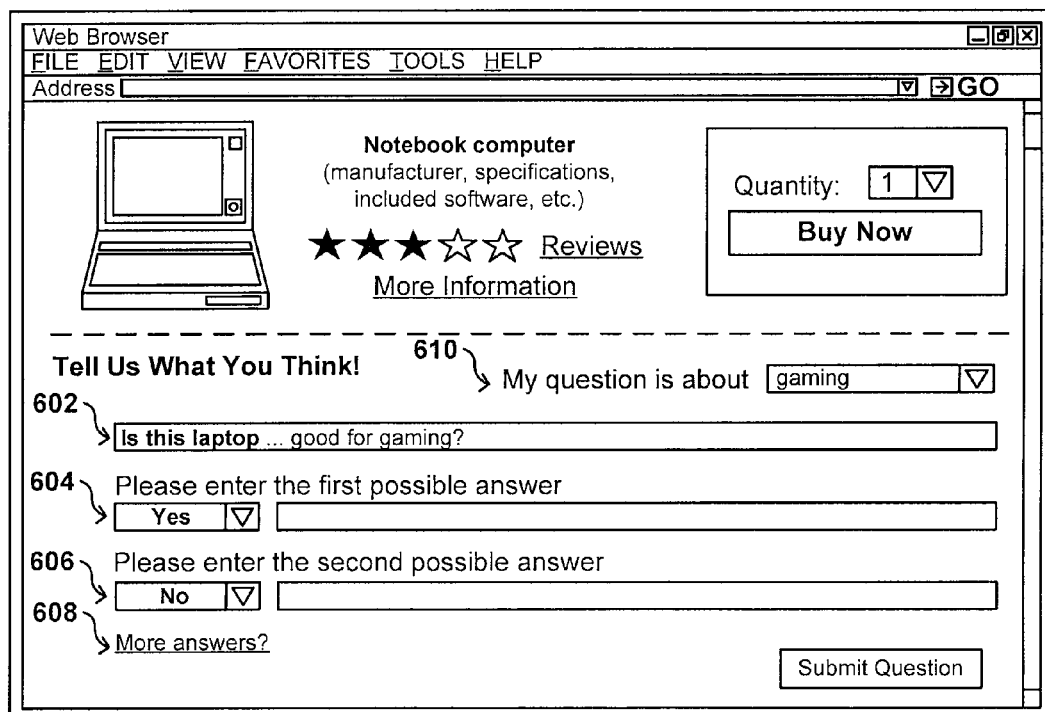
FIG. 6 illustrates an example of a user interface prompting a user for a question and answers in accordance with one embodiment.

FIG. 6 illustrates an example of one such user interface 600, wherein a user is able to view information about the item, and is also able to submit a new question. As can be seen, a user can be presented with a text entry element 602 (such as is discussed elsewhere herein) that allows the user to enter a question for which users will be able to submit responses. In some cases, at least a portion of an example question can be filled in to help guide the user to submitting a proper question (i.e., instead of an open-ended question that is difficult to answer directly such as "What are your thoughts about this item"). For example, the application for providing the retailer site can check an information data store to determine a category of the item, in this case a laptop computer. The application then can check a community or similar data store to determine which type of question is likely to be used for a laptop. In some embodiments, as is discussed elsewhere herein, a user is actually able to specify a criterion using a criterion selection element 610, which can help select the default question to be prompted to the user, but as discussed elsewhere herein this can add an undesired amount of complexity for users in certain instances.

As can be seen in the text field 602, the application can decide to enter default information for the question such as "Is this laptop . . . " in order to help guide the user. In some embodiments the user is able to delete or type over this default text and create a completely new question. Otherwise, the user can simply fill in the rest of the question, such as "good for gaming?" The system can detect whether or not a question mark is included with the question, and can ensure that a single question mark is used at the end when subsequently displayed.

This example user interface also includes response entry elements 604, 606 that allow a user to select possible responses to the question. If the user selects a default type of question, such as "Is this laptop . . . ", then the user can be prompted with default answers to the question, such as "Yes" and "No". In such a case, a drop-down menu, set of selectable options, or other such approach can be used. If a drop-down is used, for example, there can be a choice such as "other" that allows the user to input a different response than those included with the options. If the user selects to input another response, or if no such selectable element is displayed, the user can simply enter the desired response(s) in appropriate text entry element(s). Similar to the questions and selectable elements, there can be default text displayed which can then be utilized, altered, or deleted by the user. In this case, the user is able to enter any appropriate response using the response elements 604, 606. If a user wishes to enter more responses, a selectable element can be provided that allows the user to input additional possible responses. In one embodiment, one new text entry element will be presented each time the user selects the element, while in other embodiments a number of text entry elements can be presented as determined by the system or a system administrator, or as entered by the user.

Once a user has submitted the question and each desired response, the user can select a "submit" or similar option to accept the information.

As discussed previously, however, some embodiments do not display questions and answers on a primary page for an item, and instead display affirmative statements. For example, for the question "Is this laptop good for gaming," such a system would instead display with the item information a statement such as "X number of users think this laptop is good for gaming." As such, it is necessary to generate an affirmative statement that corresponds to the question and response(s), and that properly conveys the responses and feedback for the criterion for the item.

Figure 7:
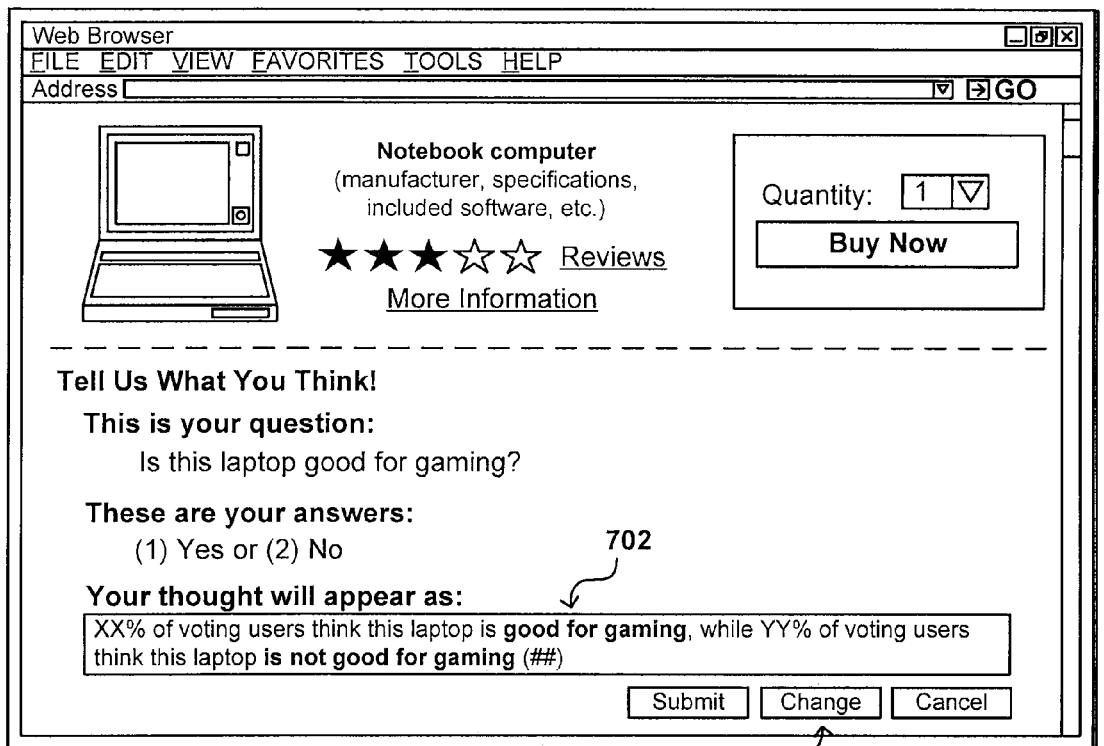
FIG. 7 illustrates an example of a user interface prompting a user for an affirmative statement in accordance with one embodiment.

FIG. 7 illustrates an example user interface 700 for generating such an affirmative statement in accordance with one embodiment. After the user submits a new question and at least one new response, the user can be directed to a portion, page, or other region of the user interface wherein the user is able to see the new question and new response(s) input by the user. In addition, the user interface can include a text entry element 702 that allows the user to enter an affirmative statement corresponding to the new question. In order to help guide the user to generating a useful statement, the text entry element can show a statement that is automatically generated based on the question and the answers. In such a case, the user can simply select a "submit" or "accept" type option to accept the suggested statement. In order to generate the default, the application can enter default placeholders (e.g., XX %) indicating where the response results will be entered into the statement. Further, if the user selected one of the prompted types of question, the application can have a standard default statement for that question type, and can insert the new responses therein. If the user did not use a known question type, the application can include logic or heuristics for parsing the question to determine nouns, verbs, etc., and can attempt to generate a statement such as "XX % of voting users think that this (noun) is (response #1), while YY % of voting users think that this (noun) is (response #2)", and so on. In one embodiment, the default statement can be directly edited by the user in the text entry element 702, except that the user must maintain any placeholders (such as XX % to enter the tally for response #1) in the statement. In another embodiment, the user can select a "change" or similar option 704 that generates an editable text element wherein the user is able to alter the affirmative statement.

Figure 8:
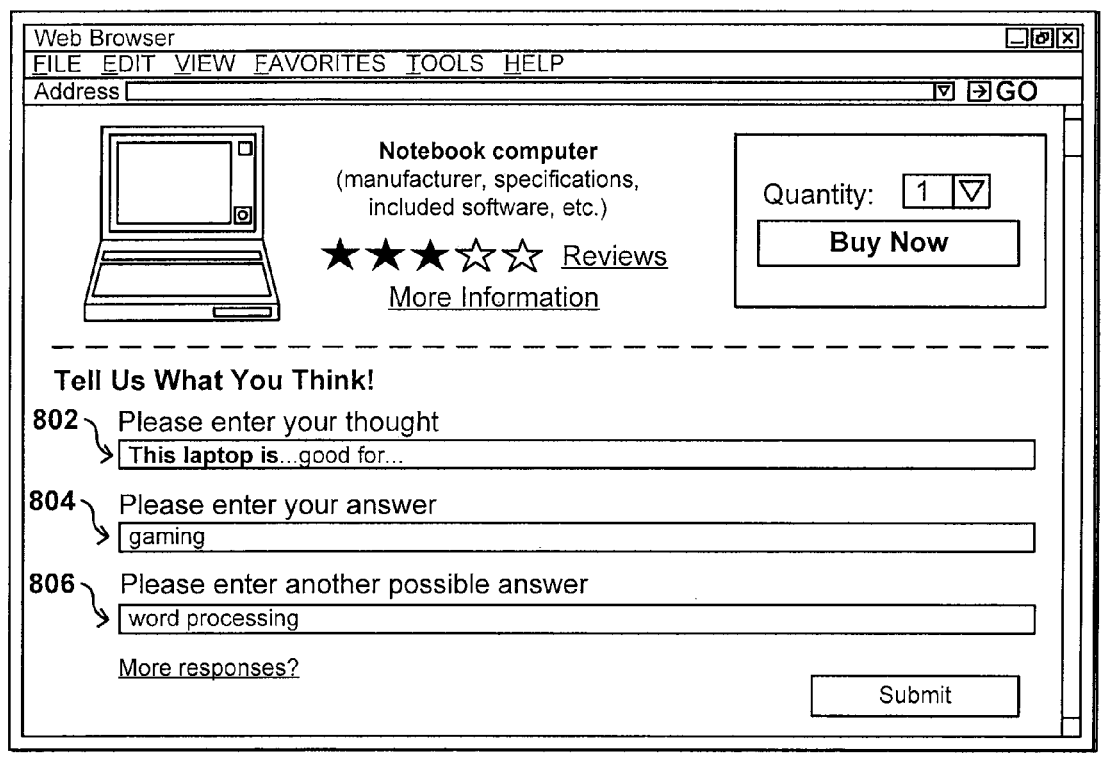
FIG. 8 illustrates an example of a user interface prompting a user for a statement and responses in accordance with one embodiment.

Although the use of questions is easily understood by users who are used to submitting answers to questions, the need to also generate and maintain an affirmative statement for each question may result in undesirable complexity for some users who prefer an easier way to leave feedback, and will result in the need for additional storage space and bandwidth usage for the provider. As an alternative, systems and methods in accordance with other embodiments instead only utilize statements to provide feedback. For example, FIG. 8 illustrates a user interface 800 that can be presented to the user to allow a user to define a statement instead of a question, which then does away with the need to also form a corresponding affirmative statement. In this example, the user is presented with a text entry element 802 that allows the user to enter the first part of a statement that can be used similarly to the question of FIG. 6. When using statements, it can be even more important to lead the user in a way that helps the user to generate a useful statement. For example, the application can determine a category or item type for the item, and can generate a default start to the statement such as "This laptop . . . ". In some instances this portion is editable, while in others it may be fixed. There also may be a number of default statement starting phrases from which the user can or must select. There also can be a suggested middle portion to the statement, which also can be selected, entered, editable, or deleted. In this example, the default statement has a fixed portion of "this laptop is" and a suggested portion of "good for", which may be suggested based on feedback for related items, etc., as discussed elsewhere herein. In this example, the user is then able to change or even delete the middle portion. For example, if the user wants to have a statement that reads "4 users think this laptop is durable, while 3 users think this laptop is easily damaged", then the user might not have a middle portion at all. Several other statement variations are possible as should be apparent in light of the discussion contained herein. The user also can be presented with response selection elements 804, 806, which can be text fields, drop-down menus, or any other such element as discussed elsewhere herein, which can allow the user to enter any number of appropriate responses to the statement. In this example the system contains logic that adds text such as "XX % users think" before the statement when presented with the actual feedback results, although other systems could include this in the editable statement presented to the user.

Figure 9:
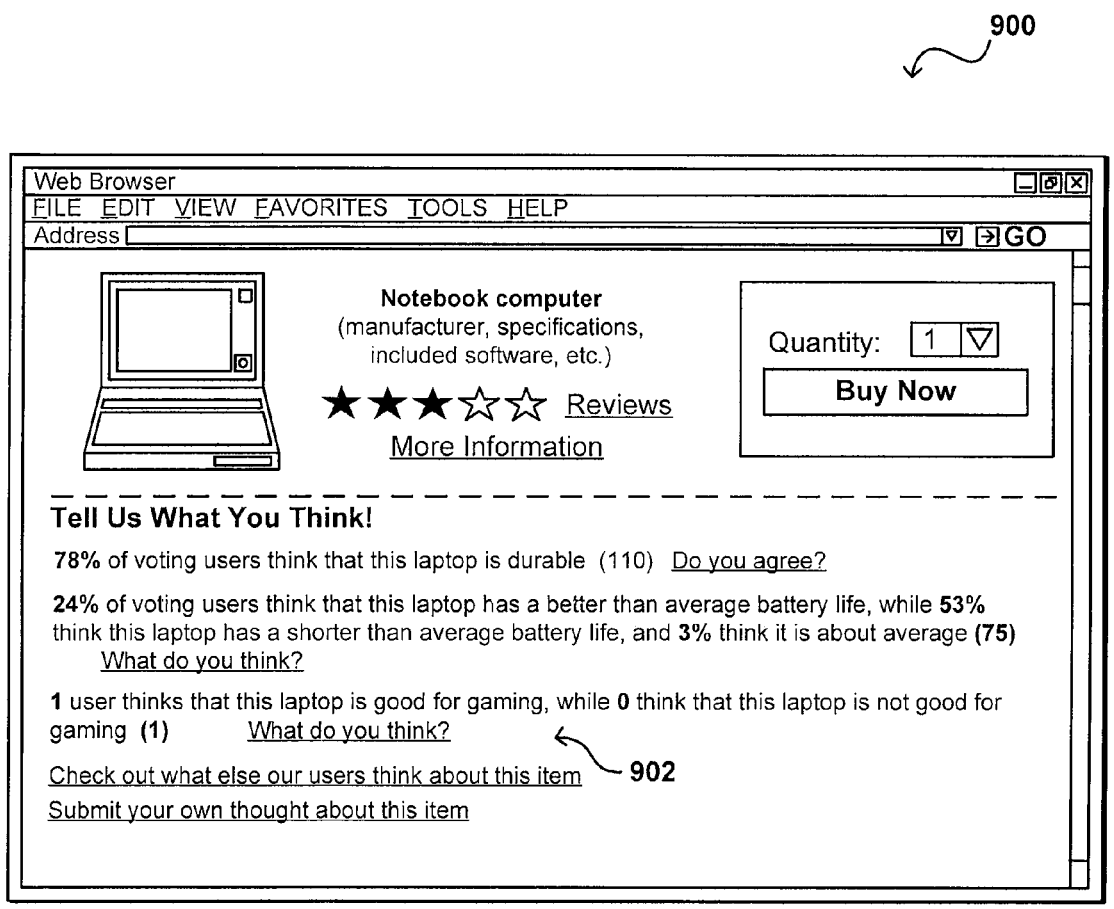
FIG. 9 illustrates an example of a user interface showing an updated response in an affirmative statement in accordance with one embodiment.

It should be noted that in this example the first response is labeled "Please enter your response", or can be labeled something similar, to indicate that when the user submits a question or statement and at least one response the user has also registered feedback for the criterion with the first response. This is beneficial to the user because the user does not have the additional step of actually having to vote for his or her own question. This also is beneficial to other users because there will not be any questions or statements that do not have at least one response, and thus would be of no help to anyone and might not ever be displayed. FIG. 9 illustrates an updated user interface 900 showing an example of the new statement 902, indicating the initial vote of the user. There can be a number of variations in the statement as discussed above.

Figure 10:
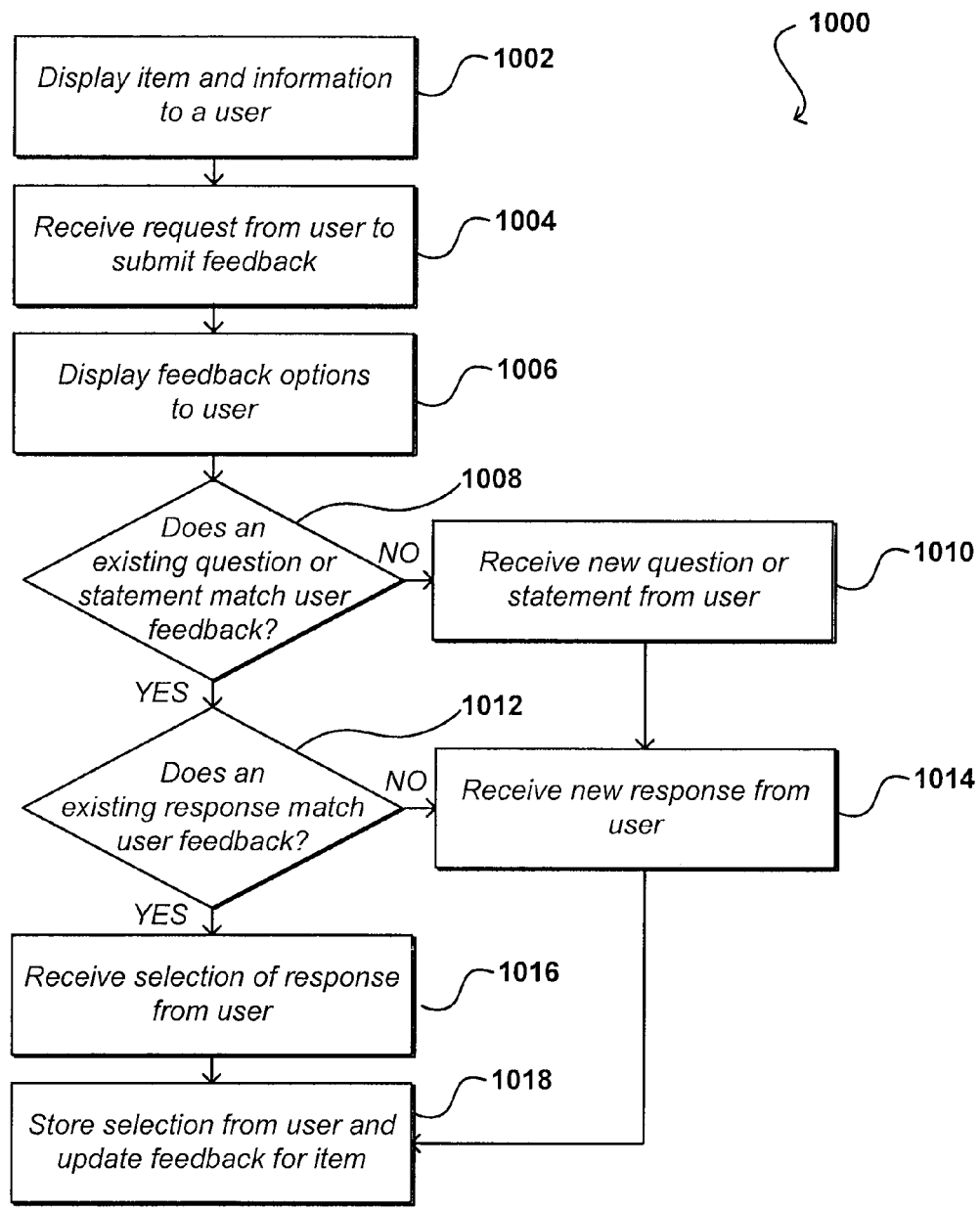
FIG. 10 illustrates a process for updating feedback for an item that can be used in accordance with one embodiment.

FIG. 10 illustrates an overview of a example method 1000 for receiving feedback from a user in accordance with one embodiment, taking advantage of various features and aspects described above. In this method, information for an item (e.g., an image and specification information) is displayed to a user 1002, such as through a page on Web site. A user viewing the item information might decide for any of a number of reasons to submit feedback for that item. In such a case, a request is received from the user to submit feedback for the item 1004. Various feedback options can be generated for display to the user 1006, such as any of the user-selectable feedback elements discussed with respect to the various user interfaces above. In some cases, at least some feedback elements are displayed to the user before a user submits a feedback request, and a user request or submission results in leaving feedback, such as where a response button is presented which the user may simply select. In other cases, however, a user might select a feedback option that triggers a new user interface display that allows the user to provide feedback, such as to provide responses for various criteria. If at least one existing statement or question is conveyed to the user (typically by a visual display but should also be understood to cover audio and other means of conveyance), a determination is made by the user as to whether the existing question or statement matches the feedback the user wishes to leave 1008. If so, another determination is made as to whether an existing response for that statement or question matches the feedback the user wishes to leave 1012. If so, the user can simply select an element or option, such as a button corresponding to a response the user wishes to submit, that corresponds to the user's desired response, and which will then be received by the system 1016 and processed as feedback. If none of the existing questions or statements match the feedback the user wishes to submit, the user can submit a new question and/or statement 1010 using any of the approaches described or suggested elsewhere herein. Along with submitting a new question and/or statement, the user also submits at least one new response 1014 to the statement and/or question, which as discussed above can also result in the user voting for one of those responses. After the new question or statement and response(s) are received from the user, or after the user selects an existing response, the selection or submission is processed and stored as feedback for the item, such that any subsequent display of feedback for the item will be updated to include the submission 1018. While these options are typically described herein with respect to a user of a computer client device submitting requests over the Internet, it should again be stated that such a process could take many forms as would be apparent to one of ordinary skill in the art in light of the teachings and suggestions contained herein, such as by pressing numerical options on a cellular phone in response to prompts, submitting messages using a message device, selecting options on a gaming system interface, etc.

Figure 11:
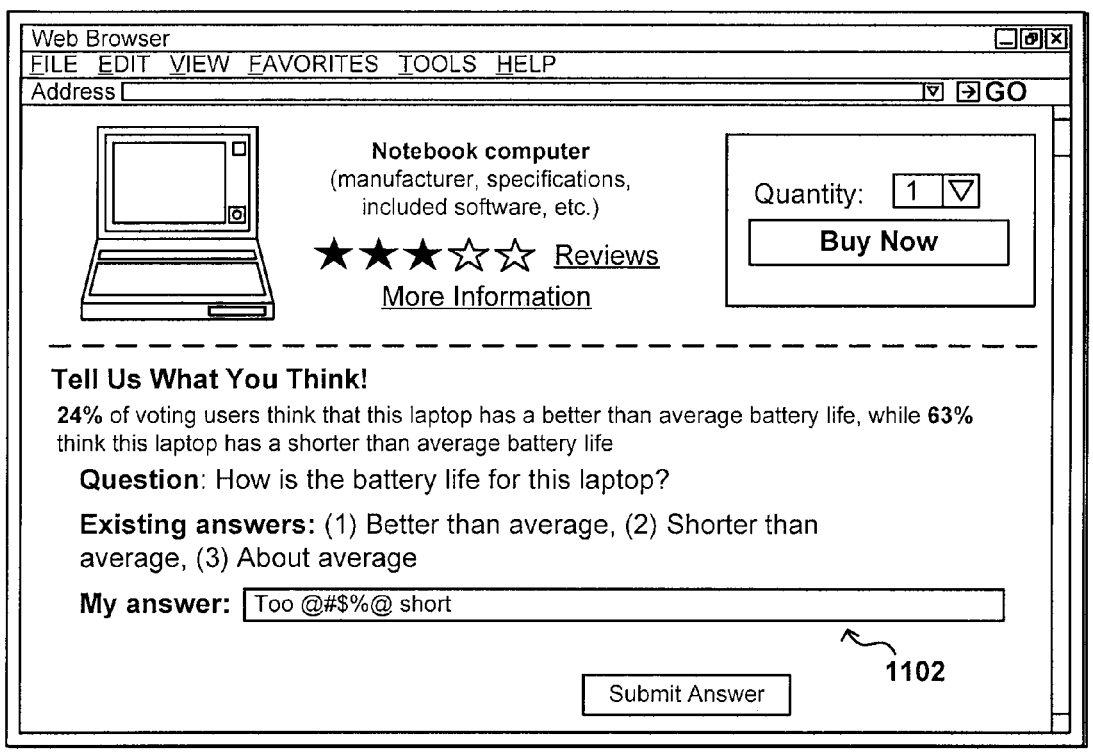
FIG. 11 illustrates an example of a user interface prompting a user for a new answer in accordance with one embodiment.

As would be expected, there can be a number of issues with allowing users to submit any question, statement, or response that can be viewed by a number of other users. FIG. 11 illustrates an example of a user interface 1100 wherein a user submits a new response 1102 that is problematic for at least two reasons. First, the response contains language that can be determined to be inappropriate for general viewing. Further, even without any expletives or inappropriate language the answer "too short" is substantially duplicative of the already existing answer "shorter than average". Input such as this can be handled in a number of different ways.

Figure 12:
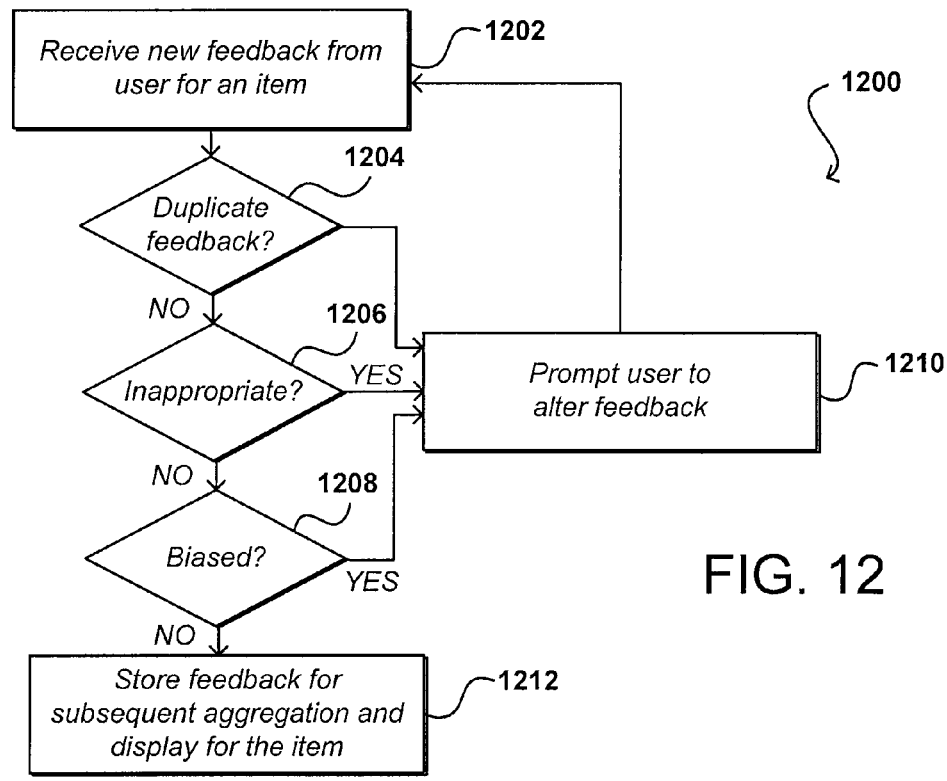
FIG. 12 illustrates a process for processing newly submitted questions, statements, and responses that can be used in accordance with one embodiment.

FIG. 12 illustrates steps of an example method 1200 for detecting such answers that can be used in accordance with one embodiment. In this example, feedback for an item is received from a user 1202, which as discussed above can include a new question, statement, and/or response. Any of a number of processes can be run to determine the appropriateness of the submission. For example, a workflow can be kicked off that calls various processes or services that each check, analyze or process a particular aspect of the submission received from the user. In one such flow, a submission is first checked using an appropriate algorithm, heuristic, etc., to determine whether the feedback is duplicative of existing feedback for that item and/or criterion 1204. This can involve applying rules, policies, or business logic to the submission, in order to determine whether the submission is an exact duplicate of another submission, or is potentially duplicative. In one example, words in the response are compared with words in the other responses to determine whether the substance of the submission is likely to already be covered in another option. A process also can examine the submission to determine whether the submission contains inappropriate language 1206. This can be done by checking the content of the submission against a library of words or phrases determined to be inappropriate, or using any other such process known or used in the art to detect such language. Another process can attempt to detect bias of the user 1208. For example, a process could examine all feedback left by a user, and if it is determined that that user always leaves negative feedback for one company's items and positive feedback for another company's item, then that user's vote can be flagged by the system as being potentially unreliable or otherwise inappropriate. Methods for detecting bias are well known in the art and will not be discussed herein in detail.

There also can be any of a number of other such processes applied to the message to determine whether to accept, aggregate, and/or display the feedback. Checks also can be run on the user at this time, such as to determine whether the user has submitted an excessive amount of feedback, whether the user rating has dropped below a minimum threshold for leaving feedback, whether a user session has expired, etc. Other known processes can be run to process submissions, such as spell-checking and grammar-checking processes. In some cases, detected problems with spelling and grammar can be corrected automatically, otherwise the submission can be flagged as being potentially problematic for later manual review. If none of the processes determine a potential problem with the submission, then the feedback can be stored for subsequent aggregation and display with the item 1212. If any of these processes determine that the submission received from the user is potentially inappropriate, or if there is any aspect of the submission that might keep it from being accepted and/or used as feedback for the item, the user can be prompted to alter the feedback submitted 1210.

Figure 13:
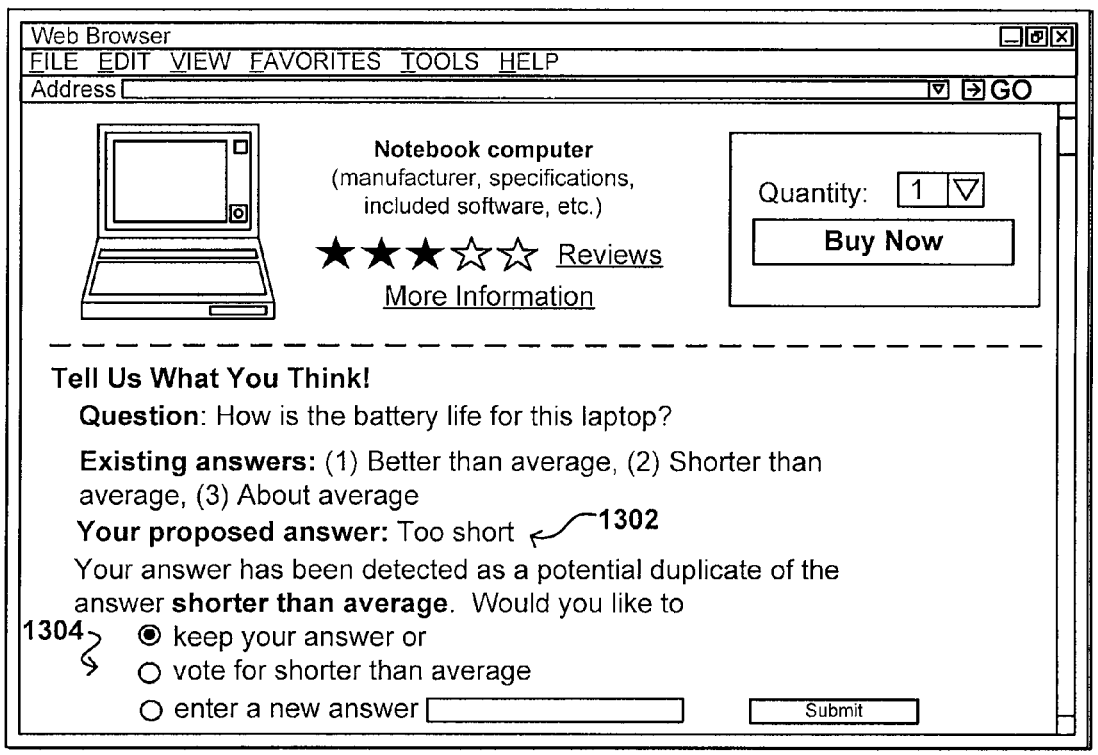
FIG. 13 illustrates an example of a user interface showing detection of a potentially duplicative answer in accordance with one embodiment.

FIG. 13 illustrates an example of a user interface 1300 that might be generated for a user in response to a process detecting a problem with a submission. In the example of FIG. 11, the user submitted the answer "too @#$%@ short". In this case, two of the processes might have picked up a potential problem with the submission. First, the inappropriate language detector might have detected the use of inappropriate language and might strip the language from the submission, prompting the user to submit the feedback without the language or alter the feedback to not include the language but still convey the user's intended feedback. Second, a process might have picked up that the answer "too short" is substantially similar to the answer "shorter than average," such as by detecting that "short" and "shorter" are variations of the same descriptive term. In this example, the user interface shows the question and/or statement and existing response(s), and also displays to the user the user's submitted feedback 1302. The user interface also indicates to the user why the submission was not accepted, in this case indicating that the system detected that the response "too short" is a potential duplicate of the answer "shorter than average". The system also displays to the user at least one option 1304 that allows the user to keep the submitted answer, vote for the existing answer that was detected to be a potential duplicate, or submit an entirely new answer. Where the user submitted inappropriate language, the user might not have the option of submitting the response in its previous form. In cases such as where an answer might potentially be a duplicate, the user can be allowed to still submit the answer if the user believes that the answer is actually not substantially duplicative.

If the user requests to keep an answer, the system can process this request in any of a number of ways. First, the system can automatically accept and store the new feedback and present the feedback with the item information in any of ways described or suggested above. In another approach, such a submission can be flagged or otherwise queued for review by an authorized person before being allowed to be stored and used as feedback. A number of ways for storing content for approval before allowing the content to be accessed are well known in the art and will not be discussed herein in detail.

Figure 14:
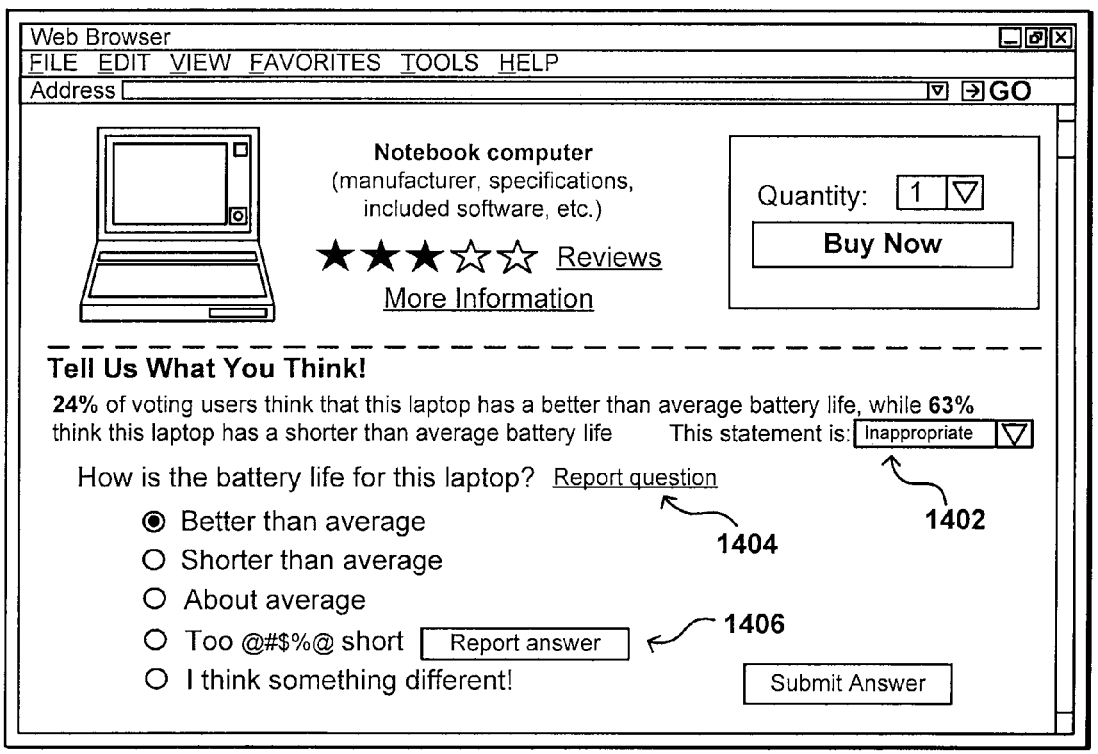
FIG. 14 illustrates an example of a user interface illustrating the new answer and reporting links in accordance with one embodiment.

If the feedback is stored and access is provided without internal review, for example, a user subsequently viewing that feedback can be provided with the ability to report or flag the feedback. For example, FIG. 14 illustrates an example of a user interface 1400 that can be displayed to a user viewing submitted feedback for an item. As can be seen, there can be any of a number of feedback reporting elements 1402, 1404, 1406 displayed with the feedback. In this example there is an option 1402 associated with the affirmative statement that allows a user to select from a drop-down box or similar type element to submit a reason why the user believes the statement contains inappropriate content or should otherwise be reviewed. Here, a user selects a reason and selects a "submit" or similar element, although the selection itself could trigger the submission, and a corresponding request is submitted to the system or application. In response to such a request, the reported feedback can be removed from the item information right away, or can simply be flagged for review while maintaining the ability to be displayed or otherwise accessed. If the feedback is removed, it still can be retained for review without being deleted. An administrator or other such person then can have the option to review the request and determine whether to allow the feedback to remain, delete the feedback, or store the feedback and simply not provide access or the ability for the feedback submission to be displayed.

While any of a number of such reporting elements can be used, a user interface can get very messy if such elements are displayed for every statement, question, and response. Accordingly, in one embodiment there is only one reporting element for each criterion, which would cover any question, statement, or response for that criterion. In other cases, only a new submission or submission without at least a minimum number of votes will have such an element displayed. For example, if a question has 1000 responses spread relatively evenly over two responses, there likely is no need to have a reporting element. Further, in such a case the provide might not wish to waste the resources of having to review requests relating to feedback that many users obviously find useful. In another embodiment, once a reviewer approves of a question, statement, or response, the option to flag that feedback might be removed. The example shows selectable elements 1404 and 1406, such as hyperlinks or selectable buttons, which relate to the question and the new response and can be used any time a user submits a new response. Each of these elements shown can trigger a new user interface (such as a new window, page, pop-up, etc.) to be generated for the user where the user can report or request a review of the content.

Figure 15:
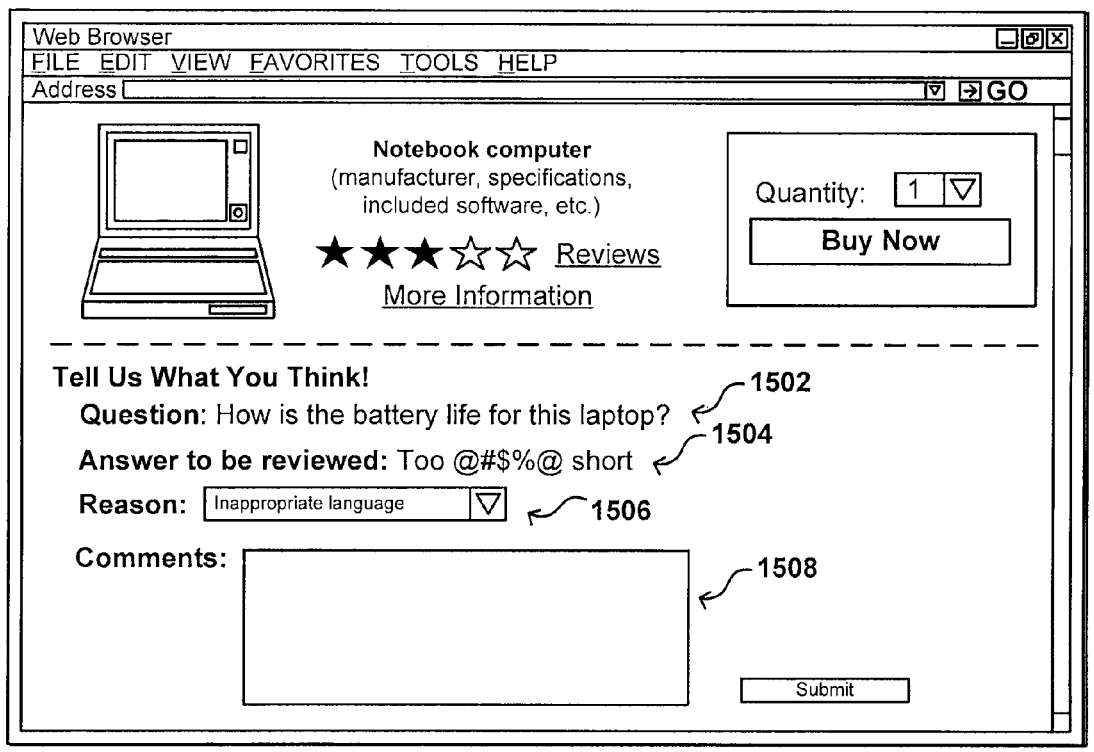
FIG. 15 illustrates an example of a user interface allowing a user to report or request review of a feedback submission in accordance with one embodiment.

FIG. 15 illustrates an example of such a user interface 1500 that can be generated for the user upon the user flagging a feedback entry. In this example where a user has selected an element to report an answer, the user is able to view the question 1502 corresponding to the response, the response 1504 at issue, and an element 1506 that allows the user to provide a reason for flagging the feedback. The user also can have an additional comments element 1508, such as a text field or other text entry element, which allows the user to provide additional reasoning for the report. Upon submitting the information, the information can be sent, queued, or otherwise stored for subsequent review whereby a reviewer can process the information as discussed above. Such an approach can be useful where the system or application did not detect a problem with the submission, but a human user is able to detect an issue such as a substantially duplicate answer or a response that does not use offensive words but is offensive based on context, etc.

Approaches such as allowing users to report inappropriate or other such content help to ensure that useful content is easily accessed by a user. Further, since the feedback displayed can be sorted so that the questions or statements with the most responses are presented first, any user-submitted questions or feedback that are not utilized by the "community" will fade toward the bottom of the displayed feedback and will not get in the way of a user attempting to find what the community implicitly determines to be more important or useful. In some systems, a question or statement that exists for a certain period of time (such as a year) without any feedback other than that submitted by the originating user may be removed or deleted in order to attempt to ensure that only the most useful information is displayed. In other embodiments, each question or statement might have a voting option such as "Was this helpful?" or "Would this information be of use to anyone?", whereby a number or percentage of negative community votes can result in the content being removed. Approaches to submitting and utilizing such feedback are well known in the art and will not be discussed in detail herein.

Figure 16:
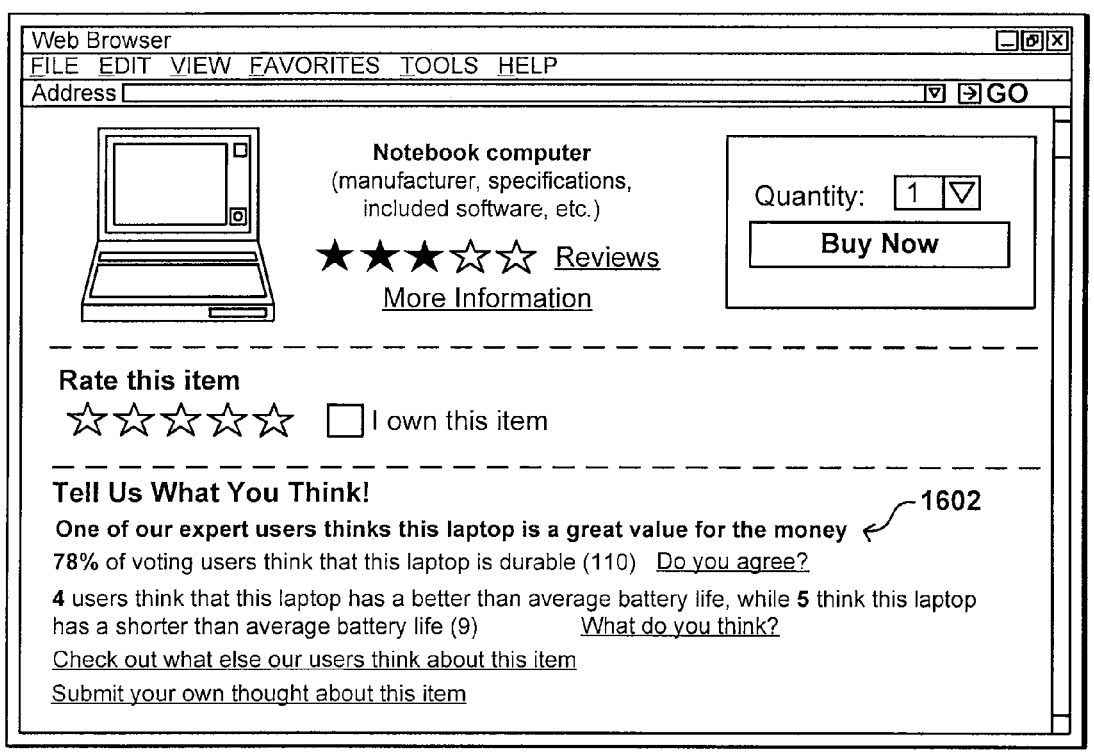
FIG. 16 illustrates an example of a user interface showing a statement of an expert user in accordance with one embodiment.

Another way to provide useful feedback to users is to allow certain users to have their feedback weighed more highly than other users. For example, the interface 1600 of FIG. 16 displays at the top of the criterion-based feedback section a statement 1602 that corresponds to feedback submitted by an "expert" user. In some systems, a user that meets a certain requirement such as a minimum community rating score, a minimum number of reviews, or any other such requirement or threshold can be determined to be a higher level user than other users. In such a case, any feedback submitted by such a user might be presented more prominently in the feedback sorting as the feedback is more likely to be reliable and/or of interest to the average user. In this case, the expert user feedback is listed separately. There can be many other approaches as could be appreciated, however, such as listing with the responses how many experts voted for that response, displaying something such as "103 of our voting users and 2 expert users think this laptop is durable." In other embodiments where percentages, graphs, histograms, or other such elements are used to display voting results, a vote of an expert user might be weighed more than that of an average user. A user might also be able to see all feedback left by an expert, such as to get a better feeling of how the expert's opinions might match up with the user's opinions, or determine exactly how much of an "expert" the expert user can be considered. In some systems feedback left by any other user also can be made available. A user also can have the option to review all feedback left by that user.

In addition to implementing ways to attempt to more prominently feature feedback determined to be more useful to average users for any given item, systems and methods in accordance with various embodiments also can allow users to compare items based on the types of criteria, discussed herein. For example, a user might be able to search for items that have feedback for a certain criterion. For example, a user might be able to not only enter keywords or a category in a search engine, but might also be able to select or enter a criterion on which to search. For example, if the user is viewing a search page for toys, and wishes to find toys that are appropriate for a toddler, the user might have the option to select or enter such information in a criterion section element, which then can present results where feedback has been submitted relating to whether the elements is suitable for a toddler. In other examples, a search engine might accept an entry from a user submitting keywords such as "good for a toddler" in a search term element, and instead of simply searching for keywords in a search index might also determine whether any feedback criteria match and might also present those items in the search results.

Figure 17:
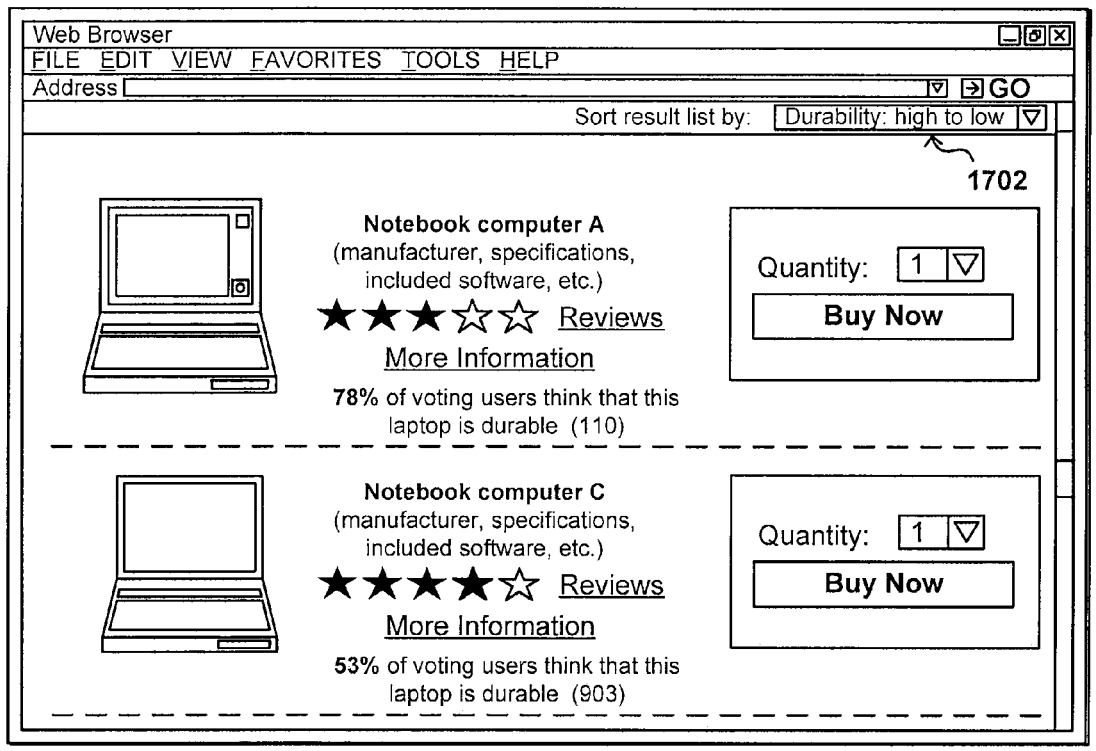
FIG. 17 illustrates an example of a user interface including sorted results based on a criterion in accordance with one embodiment.

In another example, a user might be able to sort search results based on feedback for a given criterion. For example, FIG. 17 illustrates an example of a user interface 1700 of search results. Near the top of the user interface is a user selectable sort element 1702 that allows a user to sort on a given criterion, here sorting on durability from highest to lowest. In some systems a user can be asked to submit the intended criterion along with a question or statement, but this can add additional complexity that might not be desired in all applications, and further can increase the number of sort options to an unmanageable or unnecessarily large list. In some embodiments, as discussed elsewhere herein, a number of default questions or statements and responses can be generated for items based on the type or category of the item, information about the item, related items, etc. For example, if information for a laptop computer is received, criteria such as durability and battery life might be assigned by default, and questions and responses generated as defaults accordingly. In such a case, each of these default criteria can be used to allow a user to sort based on those criteria. This can be beneficial because the user can be presented with a compact list of the most useful criteria, and provides more control over the functioning of the system. In FIG. 17, it can be seen that the first laptop listed has a positive durability feedback rating of 78%, while the second laptop has a positive durability rating of 53%. In this way, a user concerned with durability will be presented with the laptops determined by other users to be the most durable in a way that is easy and familiar to a user.

Certain logic or rules might be applied to such a sort, including a requiring a minimum number of responses or using a weighted sort. For example, a laptop that has only one durability response would have a 100% or 0% durability score, which would put it at the top or bottom of the list, while a laptop with over a thousand responses but only a 75% reliability score could be buried down on the list. The obviously is no way to accurately determine which of these laptops is more reliable based on the disparity in the number of responses. In such a case, a minimum number of responses might be required for the durability responses to count in the sort, or the number of responses could be used as a weighting factor for the sort such that a small number of responses does not undesirably skew the results of the sort. Approaches for performing weighted sorts are well known in the art and will not be discussed herein in detail. Further, other sorting approaches such as searching on multiple elements or levels (i.e., searching on a durability criterion and then a battery life criterion) can be utilized as well as would be apparent to one of ordinary skill in the art in light of the teachings and suggestions contained herein.

Figure 18:
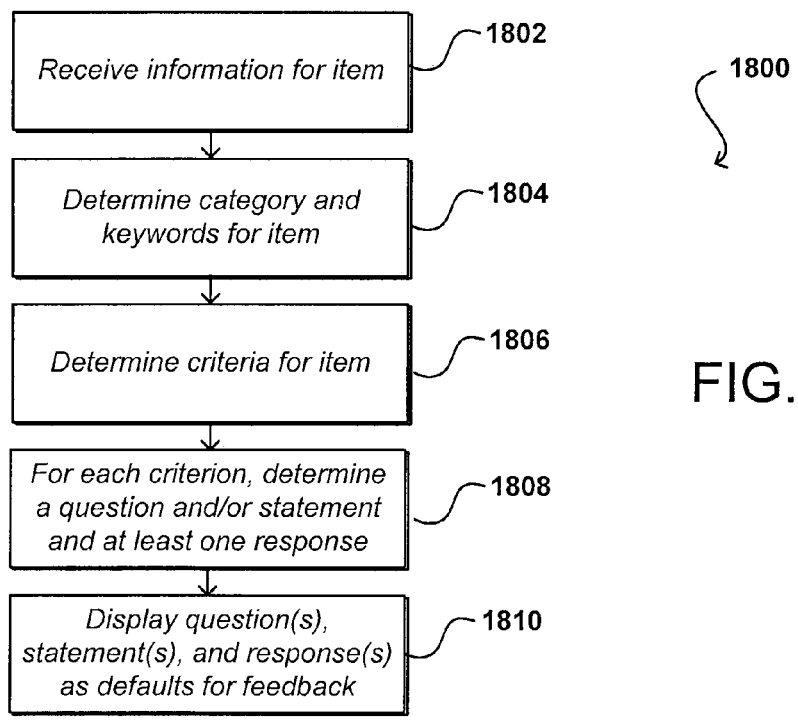
FIG. 18 illustrates a process for determining any default questions, statements, and responses for an item that can be used in accordance with one embodiment.

As discussed, such an approach in some embodiments require a determination of default criteria to be used for a sort. Other systems might simply desire to have default questions, statements, and/or responses to either display to a user or allow a user to select. FIG. 18 illustrates an example method 1800 for determining such default information that can be used in accordance with one embodiment. In this process, information is received for an item 1802. This can include, for example, specification information for an item from a manufacturer or provider. In other embodiments, this can include parsing any reviews submitted for this item or a similar items. A parsing process can analyze the specification information to perform functions such as extracting keywords and determining at least one category for the item 1804. Based on the keyword(s) and/or category(ies), the system can determine at least one default criterion for the item 1806. In the case of a laptop, the category laptop might have the criterion "durability" set as a default criterion. Further, detecting keywords in the specification information such as "screen size" or "battery life" can lead to corresponding keywords being set as defaults for the item. Once the default criteria are determined, a default question or statement and at least one default can be determined for each default criterion 1808. These can be predetermined for the application, or can be selected based on factors such as popular questions for a criterion in related items. When a user subsequently accesses information for this item, the user can see the default statements and/or questions 1810, or at least can see these as default options when the user wishes to submit feedback for the item.

In one embodiment, certain items also allow a user to directly purchase related items based on the responses. For example, a retailer site might list an item such as a compact disc that has a number of tracks. If a question exists such as "which is your favorite track", then the default responses that might be available to a user in a pull-down or other such element might be the individual tracks on that disc. If the retailer also offers those tracks for sale individually, such as in MP3 format via download, then a link or purchase option can also be displayed next to each individual response. If the feedback from the community lists one track as being by far the favorite, for example, then a user might decide to purchase only that track instead of the entire compact disc, which can easily be accomplished directly from the feedback section. Upon placing that MP3 in a virtual shopping cart, for example, the user also can be presented with suggested other tracks using processes discussed elsewhere herein for similar purposes.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers are remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of obtaining criterion-specific feedback for an item, comprising:

providing for display information for the item, the information including a user-selectable feedback element for providing feedback for the item;

in response to receiving a selection of the user-selectable feedback element, providing for display a set of user-selectable existing criteria relating to the item, a set of user-selectable existing values for each existing criterion, and a user-selectable add feedback element for providing additional feedback for the item;

receiving a selection of the add feedback element when none of the set of existing criteria substantially represents the feedback the user wishes to provide for the item;

in response to receiving a selection of the add feedback element, providing the ability for the user to input a new criterion that represents the feedback the user wishes to provide for the item and one or more new values for the new criterion, by providing the user the ability to input a new question corresponding to the new criterion and one or more new responses to the new question, the one or more new responses corresponding to the one or more new values; and in response to receiving from the user a selection of an existing value or a new value, aggregating the selection with existing feedback for the item, whereby the information subsequently provided for display for the item is able to include the aggregated feedback.

2. A computer-implemented method according to claim 1, wherein:

each existing criterion in the set of existing criteria is displayed to the user in the form of a question or statement; and each existing value in the set of existing values is displayed to the user in the form of a response.

3. A computer-implemented method according to claim 2, further comprising:

generating an affirmative statement that corresponds to the new question and that includes voting information regarding user selection of the one or more new responses as answers to the new question; and including the affirmative statement in the information that is provided for display for the item.

4. A computer-implemented method of receiving criterion-specific feedback for an item, comprising:

providing for display a representation of the item and information regarding the item; and providing a user with the ability to provide feedback for the item, including:

enabling the user to select an existing response to an existing question or statement regarding at least one existing criterion for the item;

enabling the user to specify a new response to an existing question or statement regarding the at least one existing criterion for the item;

enabling the user to select an add feedback element for providing additional feedback for the item when the at least one existing criterion does not substantially represent the feedback the user wishes to provide for the item; and in response to receiving a selection of the add feedback element, enabling the user to input a new criterion that represents the feedback the user wishes to provide for the item and one or more new values for the new criterion, by providing the user the ability to input a new question corresponding to the new criterion, and one or more new responses to the new question, the one or more new responses corresponding to the one or more new values; and aggregating feedback provided by the user with existing feedback for the item, the aggregated feedback able to be subsequently provided for display with the representation of the item and information regarding the item.

5. A computer-implemented method according to claim 4, further comprising:

when feedback received from the user includes a new question, providing the ability for the user to specify an affirmative feedback statement corresponding to the new question to be displayed with the representation of the item.

6. A computer-implemented method according to claim 5, further comprising:

pre-populating a text field for specifying the affirmative feedback statement based on the new question input by the user.

7. A computer-implemented method according to claim 4, further comprising:

providing for display to the user at least one suggested question or statement corresponding to at least one criterion for the item, each suggested question or statement able to be selected by the user as the new question or statement.

8. A computer-implemented method according to claim 4, further comprising:

providing for display to the user at least one suggested response, each suggested response able to be selected by the user as the new response.

9. A computer-implemented method according to claim 4, further comprising:

providing for display to the user a selected number of existing responses to existing questions or statements for the item, wherein a remainder of the existing responses to existing questions or statements is able to be displayed upon receiving a request from a user.

10. A computer-implemented method according to claim 9, wherein:

the selected number of existing responses to existing questions or statements are selected based on at least one of a determination by a provider of the item, a determination by a provider of an interface displaying information for the item, a number of users specifying a response for each existing question or statement, a detected bias of the user, and a level of user specifying a response for each existing question or statement.

11. A computer-implemented method according to claim 4, further comprising:

detecting and removing at least one of a duplicate question or statement, a duplicate response, an inappropriate question or statement, and an inappropriate response.

12. A computer-implemented method according to claim 4, further comprising:

storing the selected existing response or input new response for use in suggesting additional items to the user.

13. A computer-implemented method according to claim 12, wherein:

suggesting additional items to the user includes determining items purchased by other users selecting at least one existing response for the item.

14. A computer-implemented method according to claim 4, further comprising:
  providing for display to the user a plurality of items; and
  providing an ability for the user to sort or filter the displayed plurality of items based on at least one criterion or response for the item.

15. A computer-implemented method according to claim 14, further comprising:
  providing an ability for the user to sort or filter the displayed plurality of items based on a detected bias of the user.

16. A computer-implemented method according to claim 4, further comprising:
  removing at least one of a new response, an existing response, a new question, and an existing question submitted by the user based on a detected bias of the user.

17. A computer-implemented method according to claim 4, further comprising:
  analyzing at least one of a new question or statement and a new response before updating the feedback for the item.

18. A computer-implemented method according to claim 4, further comprising:
  providing the ability for the user to report at least one of inappropriate existing questions, inappropriate statements, and inappropriate existing responses.

19. A computer-implemented method of receiving criterion-specific feedback for an item, comprising:
  receiving information for a item to be displayed;
  analyzing the information to determine at least one of a category and keywords for the item;
  determining at least one criterion relating to the item based on the at least one of a category and keywords for the item;
  determining a question or statement and at least one response relating to the at least one criterion;
  receiving a selection of an add feedback element from a user when the at least one criterion does not substantially represent the feedback the user wishes to provide for the item; and
  in response to receiving the selection of the add feedback element, providing the user with the ability to provide feedback for the item by enabling the user to input a new criterion that represents the feedback the user wishes provide for the item and one or more new values for the new criterion, by providing the user the ability to input a new question corresponding to the new criterion and one or more new responses to the new question, the one or more new responses corresponding to the one or more new values; and
  aggregating feedback provided by the user with existing feedback for the item, the aggregated feedback able to be subsequently provided for display with the representation of the item and information regarding the item.

20. A system for enabling a user to provide criterion-specific feedback for an item, comprising:
  a processor; and
  a memory device including instructions that, when executed by the processor, cause the processor to:
  provide for display a representation of the item and information regarding the item; and
  provide a user with the ability to provide feedback for the item, including:
    enable the user to select an existing response to an existing question or statement regarding at least one existing criterion for the item;
    enable the user to specify a new response to an existing question or statement regarding the at least one existing criterion for the item;
    enabling the user to select an add feedback element when the at least one existing criterion does not substantially represent the feedback the user wishes to provide for the item;
    in response to receiving a selection of the add feedback element, enabling the user to input a new criterion that represents the feedback the user wishes to provide for the item and one or more new values for the new criterion, by enabling the user to input a new question corresponding the new criterion and one or more new responses to the new question, the one or more new responses corresponding to the one or more new values; and
  aggregate feedback provided by the user with existing feedback for the item, the aggregated feedback able to be subsequently provided for display with the representation of the item and information regarding the item.

21. A system according to claim 20, wherein the memory device further includes instructions that, when executed by the processor, cause the processor to:
  when feedback received from the user includes a new question, provide the ability for the user to specify an affirmative feedback statement corresponding to the new question to be displayed with the representation of the item.

22. A system according to claim 20, wherein the memory device further includes instructions that, when executed by the processor, cause the processor to:
  store the selected existing response or input new response for use in suggesting additional items to the user.

23. A system according to claim 20, wherein the memory device further includes instructions that, when executed by the processor, cause the processor to:
  provide the ability for the user to report at least one of inappropriate existing questions and inappropriate existing responses.

24. A computer program product embedded in a non-transitory computer readable medium for enabling a user to provide criterion-specific feedback for an item, comprising:
  program code for providing for display a representation of the item and information regarding the item; and
  program code for providing a user with the ability to provide feedback for the item, including:
    enabling the user to select an existing response to an existing question or statement regarding at least one criterion for the item;
    enabling the user to specify a new response to an existing question or statement regarding at least one criterion for the item;
    enabling the user to select an add feedback element when the at least one existing criterion does not substantially represent the feedback the user wishes to provide for the item; and
    in response to receiving a selection of the add feedback element, enabling the user to input a new criterion that represents the feedback the user wishes to provide for the item and one or more new values for the new criterion, by enabling the user to input a new question corresponding the new criterion and one or more new responses to the new question, the one or more new responses corresponding to the one or more new values; and
  program code for aggregating feedback provided by the user with existing feedback for the item, the aggregated feedback able to be subsequently provided for display with the representation of the item and information regarding the item.

25. A computer program product according to claim 24, further comprising:

code for providing an ability for the user to specify an affirmative feedback statement corresponding to a new question to be displayed with the representation of the item when feedback received from the user includes the new question.

\* \* \* \* \*

UNITED STATES PATENT AND TRADEMARK OFFICE
CERTIFICATE OF CORRECTION

| | | |
|---|---|---|
| PATENT NO. | : 8,122,371 B1 | Page 1 of 1 |
| APPLICATION NO. | : 11/963309 | |
| DATED | : February 21, 2012 | |
| INVENTOR(S) | : Thomas L. Keller et al. | |

It is certified that error appears in the above-identified patent and that said Letters Patent is hereby corrected as shown below:

Column 21, line 28, please delete, "receiving information for a item to be displayed;"

and insert

--receiving information for an item to be displayed--

Signed and Sealed this
Twenty-ninth Day of May, 2012

David J. Kappos
*Director of the United States Patent and Trademark Office*